March 31, 1964  M. HERVÉ  3,127,481
BIDIRECTIONAL TRANSDUCERS
Filed Nov. 10, 1959  2 Sheets-Sheet 1

INVENTOR
Marcel Hervé
By [signature]
ATTORNEYS

March 31, 1964　　　M. HERVÉ　　　3,127,481
BIDIRECTIONAL TRANSDUCERS

Filed Nov. 10, 1959　　　　2 Sheets-Sheet 2

INVENTOR
Marcel Hervé
By Holcombe, Wetherill & Brisebois
ATTORNEYS 3,127,481
BIDIRECTIONAL TRANSDUCERS
Marcel Hervé, 55 Rue Lacordaire, Paris, France
Filed Nov. 10, 1959, Ser. No. 852,045
Claims priority, application France Nov. 14, 1958
11 Claims. (Cl. 179—100.41)

The present invention relates to transducers, that is to say to devices for transforming mechanical energy into electric energy or vice-versa.

Unidirectionally sensitive transducers are already known which are capable of transforming a linear displacement into an electric signal proportional to the displacement or vice versa.

The invention is based on the possibility of assembling two unidirectionally sensitive transducers with a mechanical device, as for instance a universal joint, to obtain a transducer sensitive in two directions. The invention provides simple constructions of a bidirectionally sensitive transducer having the advantage of avoiding the inherent difficulties of mechanical coupling devices, namely excessive play and the inertia effect upon movement.

The bidirectionally sensitive transducer according to this invention is of the electrostatic type and is characterized by its electric symmetry (two bridges each consisting of four identical variable condensers) and by its mechanical symmetry (axial and central symmetry) all these properties giving mechanical stability and linear response.

The characteristics and advantages of the invention will be better understood, by reference to the embodiments hereinafter described with reference to the accompanying drawings, in which:

FIGURE 3c shows a modification of the embodiment of FIGURE 3a.

FIGURE 4b is a sectional view of a modification of the embodiment of FIGURE 4a.

Figure 6:
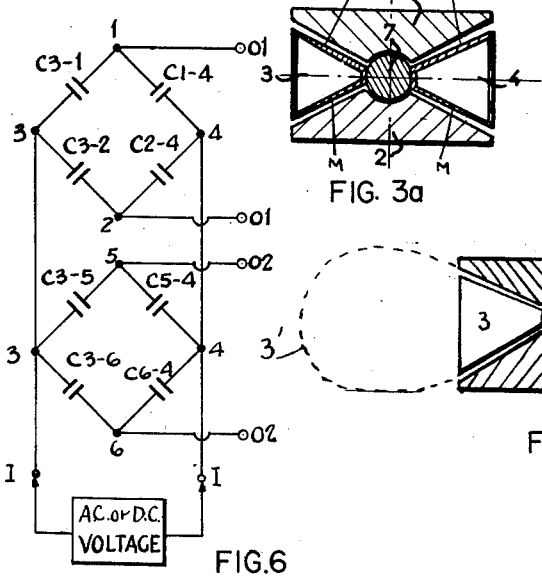
Figure 5A:
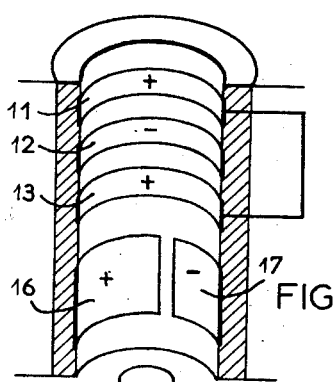
Figure 5C:
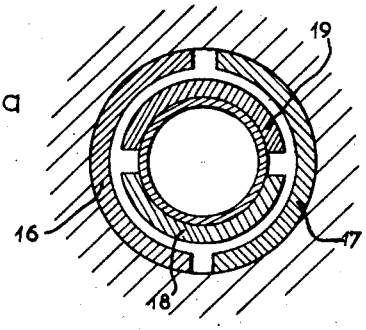
Figure 5B:
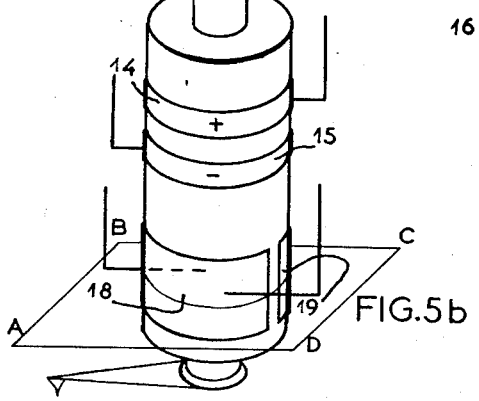

FIGURES 5a and 5b together constitute an exploded view of a further embodiment of a transducer in the form of a pick-up, FIGURE 5c is a cross-section through this latter embodiment, and FIGURE 6 is an electric circuit diagram of a transducer according to this invention showing input and output connections.

The bidirectional transducer according to this invention employs two symmetrically arranged electrostatic transducers each consisting of four variable condensers arranged as a bridge and having a linear response. This arrangement gives at any instant the components of a movement according to two rectangular axes which are the maximum directions of sensitivity of the transducer. The device may function as a receiver or transmitter, as do the majority of electrostatic and electromagnetic transducers.

In general the rest position corresponds to the electrical equilibrium of the two bridge arrangements each consisting of four variable condensers and this position may be made stable by the addition of a restoring spring, which may be a flexing bar or other device.

Figure 1A:
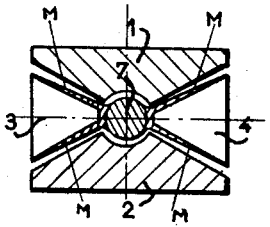
FIGURE 1a is a section through one embodiment of the transducer.
Figure 1B:
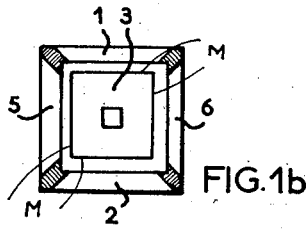
FIGURE 1b is an end view of the same embodiment.
Figure 1C:
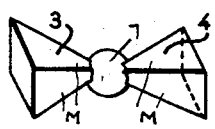
FIGURE 1c is a perspective view of the moving member of the same embodiment.

According to the embodiment of FIGURES 1a to 1c the movable part of the transducer consists of two hollow pyramid frusta 3 and 4 of an insulating material, such as polystyrene, having a centre of symmetry and generally made as light as possible and carrying metallized surfaces M which constitute the movable plates of the condensers. The fixed part is a hollow solid which contains the movable part in order to permit movement of the latter, this fixed part consisting of four mutually insulated metal portions 1, 2, 5 and 6 opposite the metal surfaces M of the movable part. Alternatively the fixed part may be made of insulating material carrying four metallized surfaces. The frusta 3 and 4 are rigidly interconnected by a spherical member 7 which allows them to move together relative to the fixed part.

Figure 1D:
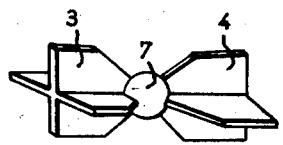
FIGURE 1d is a perspective view of the moving member of another embodiment.
Figure 1E:
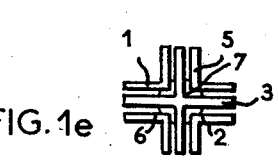
FIGURE 1e is an end view of this embodiment.

FIGURES 1d and 1e show a slightly different embodiment in which, the pyramid frusta have a cruciform cross-section and are surrounded by the four fixed stator parts of angular form.

The direct or alternating exciting voltage (if an alternating voltage is being used its frequency should be much higher than the displacement frequency of the movable part) can be applied between the two movable pyramid frusta. In this case the external surface of each frustum is completely metallized without discontinuity or the frusta are metal parts simply separated by a nonconductive joint.

The exciting voltage can also be applied between the fixed plates in pairs which means that plates 1 and 5 and plates 2 and 6 may be two distinct metallic bodies. In this case each area M of the movable part is separately metallized.

If any complex kind of movement is applied to the moving part, two separate output signal voltages proportional to the components of the displacement relative to two perpendicular axes are available, these axes are the two directions perpendicular to the axis of the transducer of a rectangular trihedral.

When the exciting voltage is applied between 3 and 4, the output voltage appears between 1 and 2 for one direction of movement and between 5 and 6 for the other.

Figure 2A:
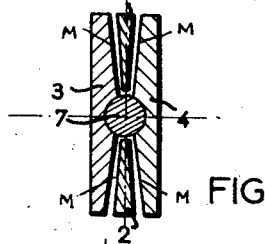
FIGURE 2a is an end sectional view of yet another embodiment whilst
Figure 2B:
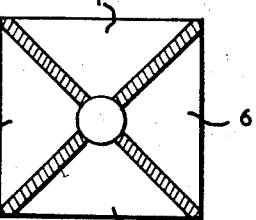
FIGURE 2b is a view of its moving member perpendicular to the axis.

When the exciting voltage is applied between the fixed parts, the signal voltages appear on the movable parts. The function of the movable and fixed parts may be inverted and if, for instance, the angle of the pyramid frusta is great, one arrives at the embodiment of FIGURES 2a and 2b where it is the previously fixed parts which are now made movable.

It is possible to replace the pyramid frusta by cone frusta or by any other surface of revolution around an axis, the metallized surfaces M being curved surfaces.

Figure 3A:
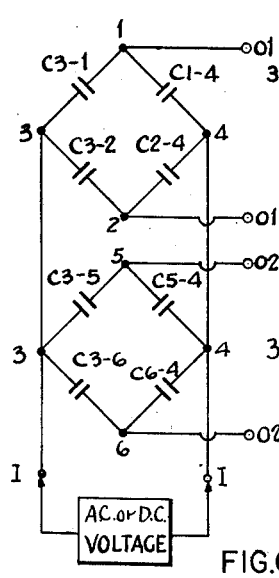
FIGURE 3a is a section through a further embodiment.
Figure 3B:
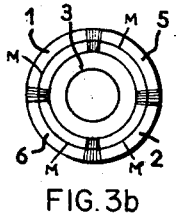
FIGURE 3b is an end view of this further embodiment.

The advantage of the cone frustum in place of pyramid frustum is not only that it is more easily made, but to avoid any output signal voltage due to a rotational movement of the movable part around its axis of symmetry. The design of the device is then shown in FIGURES 3a and 3b.

Figure 4A:
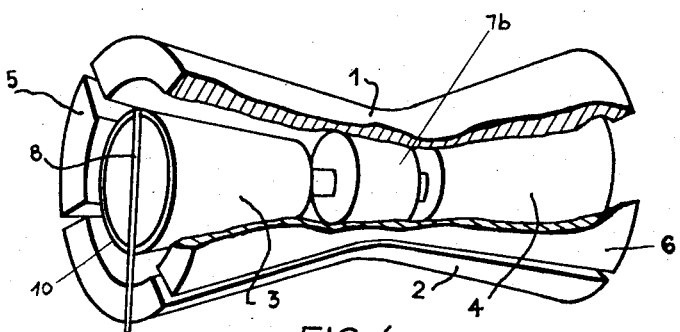
FIGURE 4a is a perspective view partly in section of a transducer in the form of a pick-up.
Figure 4B:
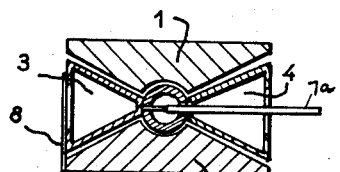

The spherical guide 7 may be completed, as shown in FIGURE 4b by a small flexible bar 7a which makes the movable part restore to its balanced position. This position corresponds generally to the electrical balance of the two condenser bridges. For this restoring device may be substituted a rubber ring 7b fixed between the fixed parts as shown in the perspective view of FIGURE 4a which is a variation of FIGURE 3a.

Figure 3C:
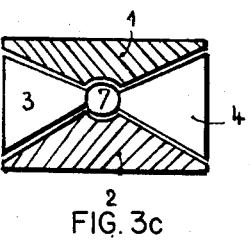

FIGURE 3c shows another application of the transducer as a bidirectional microphone. In this case the cone is prolonged beyond the stator by a light and rigid balloon 3' shown in broken lines and set in motion by sound waves. This may also replace the stylus of FIGURE 4b.

In the various forms applicable to them, the bidirectional transducers according to the invention may serve for numerous purposes. For instance, it is possible to use them as detectors of movement, or as accelerometers by the addition of a small mass, attached for instance to the centre of one large base of the movable part. (This movable part having in this case a strong restoring spring.)

The bidirectional transducers may be used too as control devices in a servomechanism and as electrostatic motors, because of generally known characteristics of electrostatic transducers which may be used either as electric generators or as electric motors.

FIGURE 4a shows a particular application of a transducer as a stereophonic phonograph pick-up.

In this design the cone frusta are hollow and made of a light metal, made rigid by a small internal edge 10. The stylus 8 is made of a small tube terminated by a diamond point and fixed on the vertical diameter of the large base of the cone frustum 3.

The output voltages are derived between members 1 and 2 for one signal and between members 5 and 6 for the other signal.

A screen or shield (not shown) is placed around the transducer at a distance to protect it against unwanted stray voltages.

A dust protective plastic film cover (not shown) protects the movable part from the atmosphere.

If the longitudinal plane of symmetry of the fixed parts 1 and 2 is vertical, the pick-up will deliver vertical components and horizontal components of a both lateral and vertical (hill and dale) record engraving, and if the fixed parts are turned around their axis through 45°, the reproduction will correspond to the so called 45/45 engraving. This particularly makes it possible to build a compatible stereophonic transducer, that is capable of reproducing records bearing only lateral engraving, or records bearing only hill and dale engraving, or records having both engraving (45/45, for instance).

It is important to observe that one can make a bidirectional transducer by separating the function of the two elementary transducers as shown by the embodiment of FIGURES 5a, 5b and 5c, in which one transducer is a light and movable insulating cylinder bearing two metal rings 14 and 15 facing fixed metal rings 11, 12 and 13, the rings 11 and 13 being connected together and a difference of potential being applied between 11, 13 and 12. This part is sensitive to an axial movement (vertically in FIGURES 5a and 5b).

A second transducer is made so far as the moving part is concerned by two hemicylindrical metal coverings 18 and 19 deposited on the same insulated movable cylindrical part as the metal rings 14 and 15, and facing two external fixed metal parts 16 and 17. This element is sensitive to rotational movements.

FIGURE 5a shows the fixed part, FIGURE 5b the movable cylindrical part, and FIGURE 5c is a cross-section through a plane perpendicular to the axis and cutting the hemicylindrical metal parts. FIGURE 6 is an electrical circuit diagram of the transducer according to this invention showing the two sets of condensers each wired as a bridge as well as the input terminals I and two sets of output terminals O1 and O2. The references 1, 2, 3, 4, 5 and 6 correspond to the metallized surfaces of the parts of the transducer shown in FIGURES 1a to 4b and the condensers bear references indicating which of these surfaces form their respective capacities. Thus condenser C1–4 is made of the adjacent metallized surfaces of parts 1 and 4, and so on.

Whilst particular embodiments have been described it will be understood that various modifications may be made without departing from the scope of this invention.

I claim:

1. An electrostatic transducer sensitive to movement in two different angularly separated directions comprising two rigid members one of which is movable relative to the other and is arranged at least partially within the other and wherein portions of the surfaces of said two members are provided with conducting areas which together form condensers between the two members, said condensers being connected to form two separate bridge networks each consisting of four condensers of similar electrical value, means for feeding an exciting potential to the input of each bridge network and means for deriving an output signal from each bridge network respectively proportional to the movement in one of the two angularly separated directions.

2. A transducer as claimed in claim 1, wherein the movable member comprises two parts having conducting areas forming the movable plates of the condensers, said two parts being interconnected by a member forming a bearing allowing said two parts to move relative to the fixed member which surrounds the movable member and which has conducting areas forming the fixed plates of the condensers.

3. A transducer as claimed in claim 2, in which the two parts of the movable member are formed as pyramid frusta.

4. A transducer as claimed in claim 2, in which the two parts of the movable member have a cruciform cross-section.

5. A transducer as claimed in claim 2, in which the two parts of the movable member are formed as cone frusta.

6. A transducer as claimed in claim 1, in which the movable member comprises a cylinder mounted for axial and rotational movement within a second cylinder forming the fixed member and the movable and fixed cylinders respectively carry conducting areas constituting the movable and fixed plates of the condensers.

7. A transducer as claimed in claim 1, in which the movable member carries a stylus whereby the transducer forms a stereophonic pick-up device for gramophone records.

8. A transducer as claimed in claim 1, in which the device is arranged to form a microphone and including a lightweight rigid hollow bulb on which the sound waves impinge attached to the movable member.

9. An electrostatic transducer comprising two rigid members one of which is movable relative to the other in two different angularly separated directions and one of which is arranged at least partially within the other, and wherein portions of the surfaces of said two members are provided with conducting areas so as to form condensers between the two members and the condensers are connected to form two separate bridge networks each consisting of four condensers of similar electrical value and means attached to said movable member for imparting mechanical vibrations to said movable member.

10. A transducer as claimed in claim 9, in which the movable member carries a stylus whereby the transducer forms a stereophonic pick-up device for gramophone records.

11. A transducer as claimed in claim 9, in which the device is arranged to form a microphone and including a lightweight rigid hollow bulb on which the sound waves impinge attached to the movable member.

References Cited in the file of this patent

UNITED STATES PATENTS

| 2,843,679 | Hogue | July 15, 1958 |
| 2,974,202 | Herve | Mar. 7, 1961 |